United States Patent
Shu

[11] Patent Number: 6,030,104
[45] Date of Patent: Feb. 29, 2000

[54] SOFT SHELLED LAMP SHADE

[76] Inventor: Cheng Cheng Shu, No. 39, Lane 81, Sec. 7 ChungSan North Rd., Taipei, Taiwan

[21] Appl. No.: 09/137,324

[22] Filed: Aug. 20, 1998

[30] Foreign Application Priority Data

Oct. 21, 1997 [TW] Taiwan ................................. 86217735
Jul. 2, 1998 [TW] Taiwan ................................. 87210641

[51] Int. Cl.[7] ................................................. B60Q 1/00
[52] U.S. Cl. ......................... 362/486; 362/487; 362/509; 362/547; 362/510; 362/351; 362/294; 362/191; 362/806
[58] Field of Search ..................................... 362/486, 487, 362/493, 495, 496, 505, 506, 311, 190, 191, 294, 351, 806, 510, 509

[56] References Cited

U.S. PATENT DOCUMENTS

| | | | |
|---|---|---|---|
| 4,443,832 | 4/1984 | Kanamori et al. | 362/84 |
| 4,602,320 | 7/1986 | Tomkin et al. | 362/269 |
| 4,811,173 | 3/1989 | Johnson | 362/190 |
| 5,193,895 | 3/1993 | Naruke et al. | 362/545 |
| 5,456,032 | 10/1995 | Matsumoto et al. | 362/103 |

*Primary Examiner*—Thomas M. Sember
*Attorney, Agent, or Firm*—Merchant & Gould P.C.

[57] ABSTRACT

A soft shelled lamp shade comprising: a shade body formed of soft plastics having good light transmission and heat resistance, the shade body having a bottom surface with a hollow cylindrical body projected therefrom, a recess being formed on the bottom surface around the cylindrical body, a receiving chamber being further formed within the shade body, the receiving chamber being opened at a hollow end of the cylindrical body, and a double-sided adhesive tape being in the shape of a sheet and having an upper and a lower surfaces, the upper surface being at least partially adhered into the recess on the bottom surface of the shade body. Since the shade body is formed of soft light conducting and heat resistant plastics, the shade body can be made into any desired shape. When the soft shelled lamp shade and a set of bulbs are secured to an automobile or a motorcycle, light can be emitted through the shade body from the bulbs. In addition, the bulbs can be protected from being broken due to collision or hitting of the car.

14 Claims, 4 Drawing Sheets

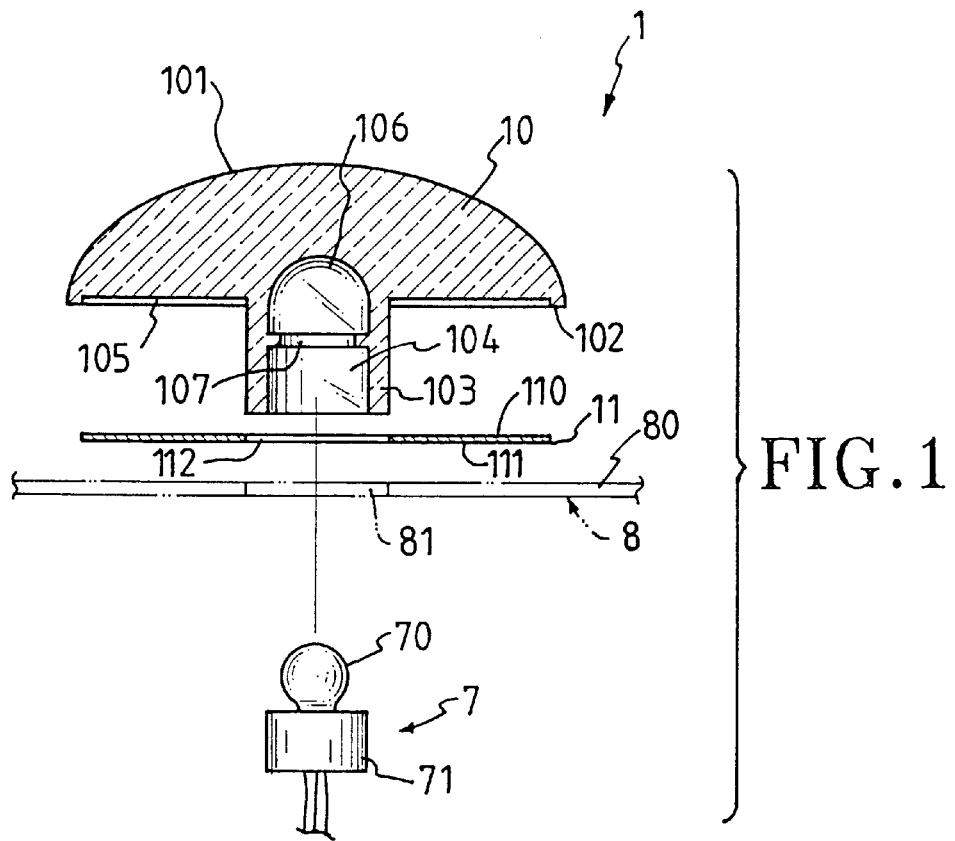
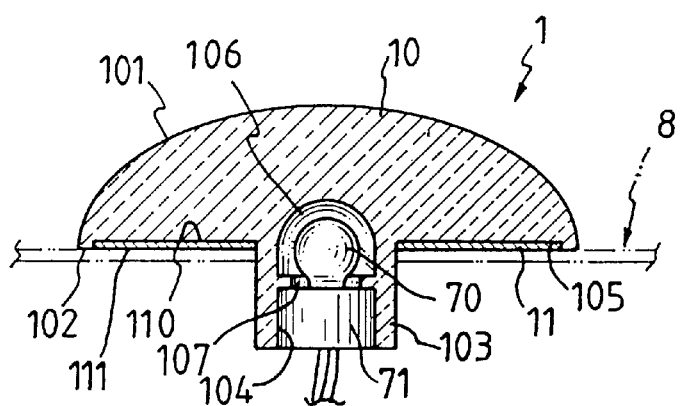

SOFT SHELLED LAMP SHADE

FIELD OF THE INVENTION

The present invention relates to a soft shelled lamp shade formed of soft plastics having good light transmission and heat resistance. By placing a bulb set therein and using a double-sided adhesive tape, the lamp shade can be installed on a car panel, under a ceiling, in a cabinet, on a desk, or at some other places.

BACKGROUND OF THE INVENTION

While installing a conventional lamp, in addition to a bulb and a power cord, a lamp base and a shade must be also provided, which needs considerable space and wastes much time and labor for installation. Further, the lamp shades are often made of hard fragile material, which are easily damaged and deformed once being hit. For example, for installing a signal light on a car, a recess must be first formed on the car panel, a lamp base be secured to the recess, and a bulb is fixed on the base and then covered with a lamp shade fastened to the car panel or fender. Such installation process is cumbersome and takes much time and labor. Moreover, the lamp shade is extremely susceptible to breakage, even the bulb may be broken during car accidents.

SUMMARY OF THE INVENTION

To overcome the disadvantages of conventional lamp shades, the primary objective of the present invention is to provide a soft shelled lamp shade with a shade body thereof being integrally formed of soft plastics. The soft shelled lamp shade in accordance with the present invention can be made at low cost and in any shape as desired, and is less susceptible to the bulb breakage resulting from collision or hitting.

Another objective of the present invention is to provide a soft shelled lamp shade which can be installed at any desired place.

A further objective of the present invention is to provide a soft shelled lamp shade wherein the double-sided adhesive tape will not be exposed after the shade is installed.

Another further objective of the present invention is to provide a soft shelled lamp shade which has a heat dissipating function.

Another objective of the present invention is to provide a soft shelled lamp shade wherein the various ornaments can be added as desired so as to present an aesthetic appearance.

A further objective of the present invention is to provide a soft shelled lamp shade assembly which includes a bulb socket and can be placed under a ceiling, on a wall, in a cabinet, etc.

Still another objective of the present invention is to provide a soft shelled lamp shade having self-contained power source such that the lamp can be used even during a power blackout.

To achieve the above and other objectives, the present invention provides a soft shelled lamp shade comprising: a shade body formed of soft plastics having good light transmission and heat resistance, the shade body having a bottom surface with a hollow cylindrical body projected therefrom; a recess being formed on the bottom surface around the cylindrical body; a receiving chamber being further formed within the shade body, the receiving chamber being opened at a hollow end of the cylindrical body, and a double-sided adhesive tape being in the shape of a sheet and having an upper and a lower surfaces, the upper surface being adhered into the recess on the bottom surface of the shade body. Ventilation holes may be formed on the shade body for dissipating the heat generated by the bulb. A plurality of pellets may be provided within the shade body. In addition, a bank of batteries may also be provided within the shade body such that the lamp can also be used during a power blackout.

From the description of the preferred embodiments and with reference to the accompanying drawings, the structure and features of the subject invention will be better understood by those skilled in the art.

BRIEF DESCRIPTION OF THE DRAWINGS

FIG. 1 is an exploded view of a first embodiment of a soft shelled lamp shade according to the present invention;

FIG. 2 is a cross-sectional view of a first embodiment of a soft shelled lamp shade according to the present invention;

DETAILED DESCRIPTION OF THE PREFERRED EMBODIMENTS

Figure 3:
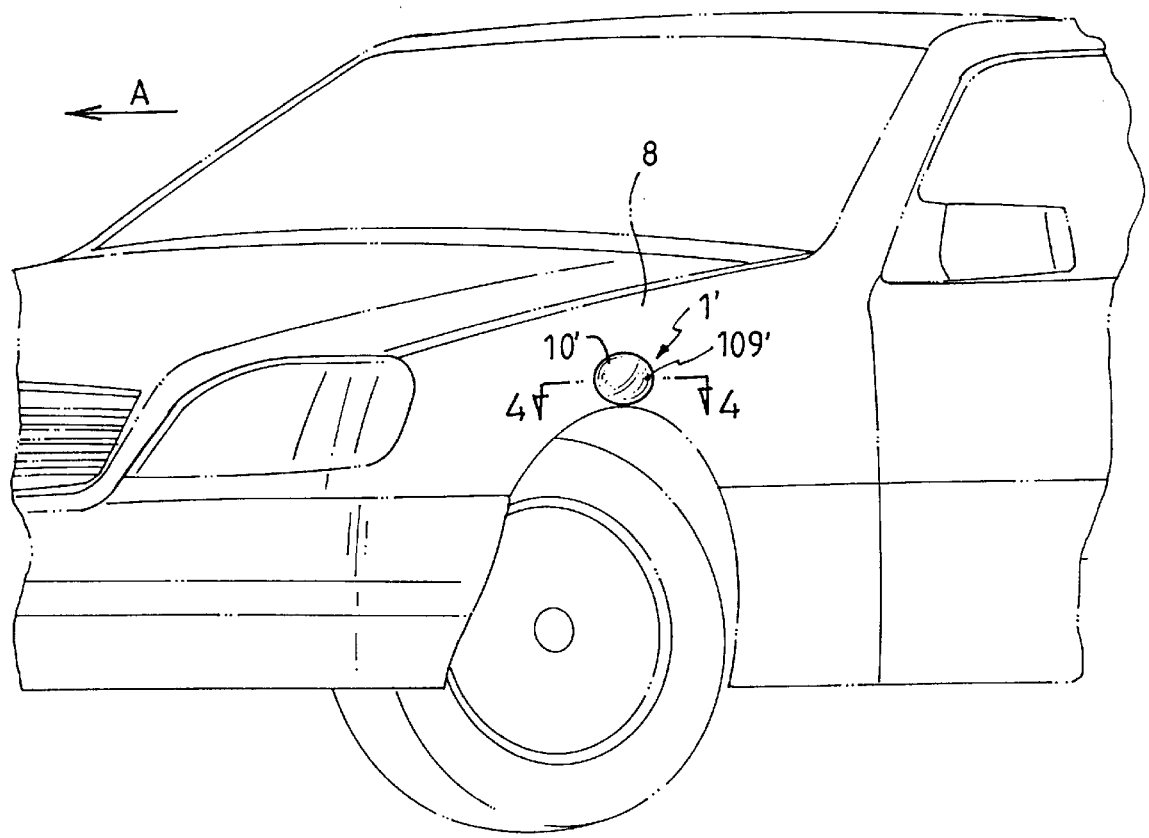
FIG. 3 is a view showing the state of use of a second embodiment of a soft shelled lamp shade according to the present invention.

FIG. 1 is an exploded view of a first embodiment of a soft shelled lamp shade according to the present invention. As shown, the soft shelled lamp shade 1 of the present invention comprises a shade body 10 and a double-sided adhesive tape 11. The shade body 10 is formed of soft plastics having good light transmission and heat resistance, which is generally in the shape of a hemisphere and has an outer surface 101 and a bottom surface 102. A hollow cylindrical body 103 is projected from the axial center of the bottom surface 102 and a cavity 104 is formed therein. A recess 105 is further formed on the bottom surface 102 around the hollow cylindrical body 103 and a receiving chamber 106 is formed at the axial center of the shade body 10. In addition, the top face of the receiving chamber 106 is arcuate in shape. The receiving chamber 106 is opened at a hollow end of the hollow cylindrical body 103 and is formed into an opening 107.

The hollow cylindrical body 103 and the receiving chamber 106 are provided for receiving a bulb set 7 consisting of a bulb 70 and a bulb socket 71. The opening 107 is designed in a way of allowing only the bulb 70 but not the bulb socket 71 to pass through. The cavity 104 is designed to have a cross-section with a diameter slightly smaller than or equal to that of the bulb socket 71. While assembling, the bulb 70 is first screwed into the bulb socket 71 to constitute the bulb set 7, and then the bulb set 7 is fitted into the cavity 104 in the hollow cylindrical body 103. The bulb 70 thus passes through the opening 107 and into the receiving chamber 106, and the bulb socket 71 is left in the cavity 104 located in the hollow cylindrical body 103. Since the shade body 10 is made of soft plastics, even the diameter of the cross-section of the cavity 104 is slightly smaller than that of the bulb socket 71, the bulb socket 71 can still be fitted into the cavity 104 and secured tightly within the cavity 104 in the hollow cylindrical body 103. The bulb set 7 is thus installed in the shade body 10.

Next, the shade body 10 comprising the bulb set 7 is secured onto the car panel 8 by the double-sided adhesive tape 11. The double-sided adhesive tape 11 is generally in the shape of a sheet having an upper surface 110 and a lower surface 111 and formed into a hole 112 with an area the same as that of the cross-section of the hollow cylindrical body 103. The car panel 8 also has an upper surface 80 with a previously drilled hole 81. The area of the hole 81 is equal to or larger than that of the cross-section of the hollow cylindrical body 103. At this point, the hollow cylindrical body 103 is passed through the hole 112 on the double-sided adhesive tape 11, the upper surface 110 is adhered to the recess 105 on the bottom surface 102 of the shade body 10, and the lower surface 111 of the double-sided adhesive tape 11 is adhered to the upper surface 80 of the car panel 8. The soft shelled lamp shade 1 and the bulb set 7 are thus secured to the car panel 8, as shown in FIG. 2.

Since the shade body 10 is formed of soft plastics having good light transmission and heat resistance, the shade body 10 can be made into any preferred or desired shape. After the soft shelled lamp shade 1 and the bulb set 7 are secured to the car panel 8, light from the bulb 70 can be emitted through the shade body 10. In addition, the shade body 10 is less susceptible to damage and the bulb 70 therein is not easy to break due to collision or hitting of the car.

In use, it is easy to replace the bulb 70. While replacing the bulb 70, the double-sided adhesive tape 11 does not have to be separated from the shade body 10. The user just needs to pull the bulb set 71 out of the hollow cylindrical body 103, remove the old bulb 70 from the bulb socket 71 and replace the old bulb 70 with a new one. The bulb set 7 containing a new bulb is then inserted into the hollow cylindrical body 103.

Figure 4:
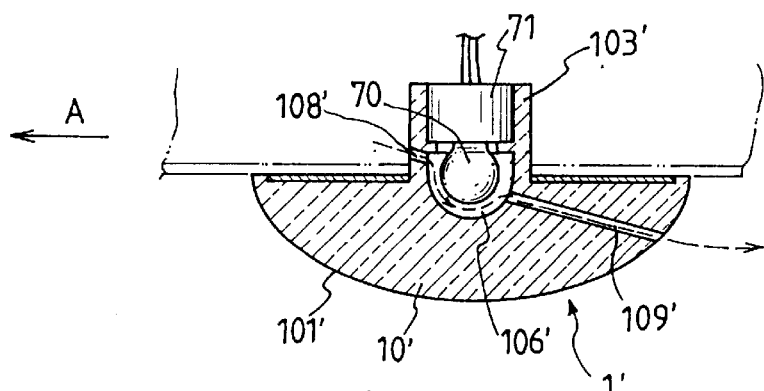
FIG. 4 is a cross-sectional view of a second embodiment of a soft shelled lamp shade according to the present invention.

FIG. 3 is a view showing the state of use of a second embodiment of a soft shelled lamp shade according to the present invention. As shown, the soft shelled lamp shade 1' of the present invention is provided on the car panel 8. In the present embodiment, the structure and installation of the soft shelled lamp shade 1' is substantially the same as those of the soft shelled lamp shade 1 in the first embodiment. In addition, in this embodiment shown in FIG. 4, the shade body 10' is formed into a ventilation hole 109' passing through the receiving chamber 106' to the outer surface 101' of the shade body 10' on the car panel, and a ventilation hole 108' passing through the outer surface of the hollow cylindrical body 103' in the car panel 8 to the receiving chamber 106' in the shade body 10'. The orientation of the ventilation hole 108' and ventilation hole 109' are opposite to the moving direction (arrow A) of the car, such that when the car is moving, air can enter the receiving chamber 106' from the ventilation hole 108' and the heat generated by the bulb 70 is dissipated through the ventilation hole 109'. Moreover, since air entering the ventilation hole 108' is from the underside of the car panel 8, rain drops will not flow into the ventilation hole 108'.

Figure 5:
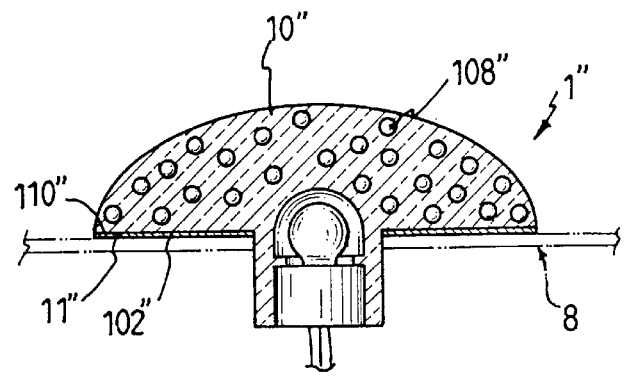
FIG. 5 is a cross-sectional view of a third embodiment of a soft shelled lamp shade according to the present invention.

FIG. 5 is a cross-sectional view of a third embodiment of the soft shelled lamp shade according to the present invention, wherein the stricture and installation of the soft shelled lamp shade 1" is substantially the same as those of the soft shelled lamp shade 1 in the first embodiment, except that in the present embodiment, no recess is formed on the bottom surface 102" of the shade body 10" and the upper surface 110" of the double-sided adhesive tape 11" is adhered directly to the bottom surface 102" of the shade body 10". In this embodiment, a plurality of pellets 108" can be provided in the shade body 10" for specific purposes or to enhance the aesthetic effect. The pellets 108" which can be of different colors are uniformly dispersed in the shade body 10" and can transmit light or reflect light such that while using the soft shelled lamp shade 1", light can transmit through the shade body 10" having the pellets 108" and allow the lamp shade to be designed functionally and to enhance the aesthetic effect.

In the above three embodiments, the soft shelled lamp shades 1, 1', 1" are designed primarily for use on the car panel, but they can be used otherwise, such as on a wall, in a cabinet, etc. Although not shown and described, the upper surfaces 110, 110', 110" of the double-sided adhesive tapes 11, 11', 11" can be printed with various stripes or patterns for specific purposes or to enhance the aesthetic effect. While in using, these stripes or patterns can appear through the shade bodies 10, 10', 10".

Moreover, the shade bodies 10, 10', 10" are not limited to a single soft plastic shade body. They can consist of two or more layers of soft plastics, each with a different color for specific purposes or to enhance aesthetic effects.

In addition, although not shown, tongues can be provided around the hollow cylindrical bodies 103, 103', 103" of the shade bodies 10, 10', 10" to assist securing the shade bodies 10, 10', 10" onto the car panel 8.

Other embodiments of the present invention will now be described as follows.

Figure 6:
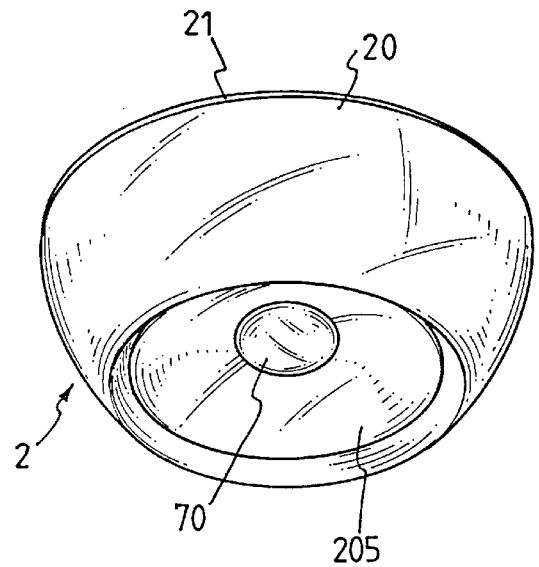
FIG. 6 is a perspective view of a fourth embodiment of a soft shelled lamp shade according to the present invention.
Figure 7:
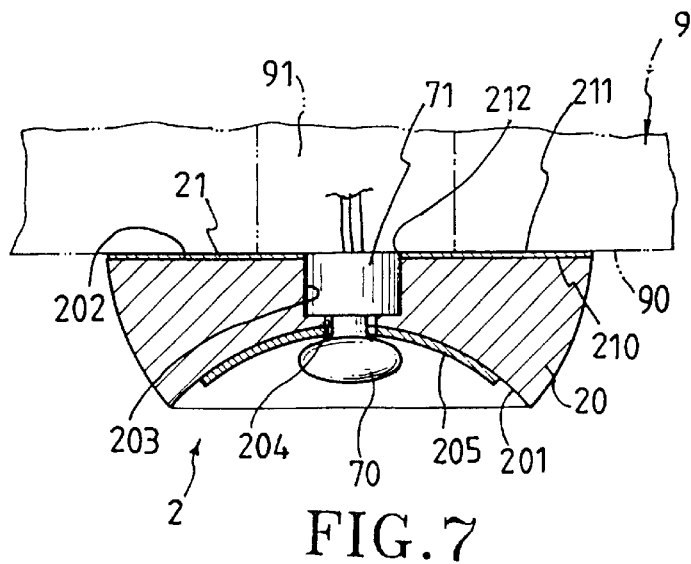
FIG. 7 is a cross-sectional view of a fourth embodiment of a soft shelled lamp shade according to the present invention.

FIGS. 6 and 7 are a perspective view and a cross-sectional view, respectively, of a fourth embodiment of the soft shelled lamp shade according to the present invention. As shown, the soft shelled lamp shade 2 of the present invention comprises a shade body 20 and a double-sided adhesive tape 21. The shade body 20 is formed of soft plastics having good light transmission and heat resistance and generally in the shape of a hemisphere with the top face formed inwardly into an arcuately recessed face, or outer surface 201. The shade body 20 further has a bottom surface 202. The axial center of the shade body 20 is formed into a cylindrical receiving chamber 203, with one end thereof open at the axial center of the arcuately recessed face 201 and is formed into an opening 204, and the other end open on the bottom surface 202. A reflective plate 205 is provided on the arcuately recessed face 201 to increase the brightness and to reflect the heat generated by the bulb 70.

The cylindrical receiving chamber 203 is provided for receiving the bulb socket 71, which has a cross-section with its diameter slightly smaller than or equal to that of the bulb socket 71. The opening 204 is designed to allow only the bottom end of the bulb 70 but not the bulb 70 and the bulb socket 71 to pass through. While assembling, the bulb socket 71 is first placed in the cylindrical receiving chamber 203, and then the bottom end of the bulb 70 is passed through the opening 204 and screwed into the bulb socket 71. Since the shade body 20 is made of soft plastics, even the diameter of the cross-section of the cylindrical receiving chamber 203 is slightly smaller than that of the bulb socket 71, the bulb socket 71 can be fitted into the cylindrical receiving chamber 203 and secured in the cylindrical receiving chamber 203 by the wall of the receiving chamber 203. The bulb set 7 is thus installed in the shade body 20.

Next, the shade body 20 comprising the bulb set 7 is secured to the ceiling 9 by the double-sided adhesive tape 21. The double-sided adhesive tape 21 is generally in the shape of a sheet which has an upper surface 210, a lower surface 211 and is formed into a hole 212. The area of the hole 212 is the same as that of the cross-section of the cylindrical receiving chamber 203. The ceiling 9 has a previously drilled hole 91 and the area of the hole 91 is larger than that of the cross-section of the cylindrical receiving chamber 203. At this point, the upper surface 210 of the double-sided adhesive tape 21 is adhered to the bottom surface 202 of the shade body 20, and then the lower surface 211 of the double-sided adhesive tape 21 is adhered to the upper surface 90 of the ceiling 9. The soft shelled lamp shade 2 and the bulb set 7 are thus secured to the ceiling 9 as shown in FIG. 6.

Figure 8:
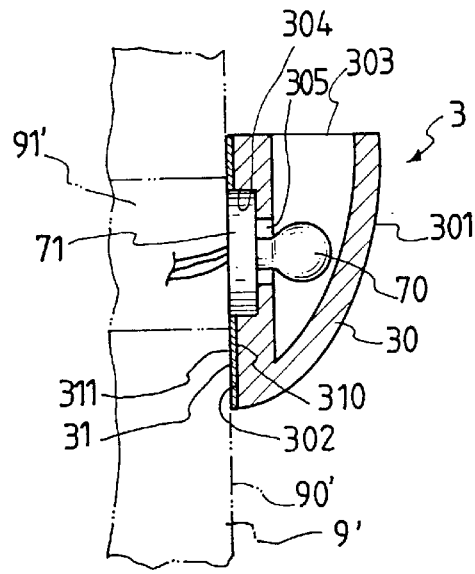
FIG. 8 is a cross-sectional view of a fifth embodiment of a soft shelled lamp shade according to the present invention.

The soft shelled lamp shade in accordance with the present invention can be installed not only under the ceiling 9 but also on a wall. FIG. 8 is a cross-sectional view of a fifth embodiment of the soft shelled lamp shade according to the present invention. As shown, the soft shelled lamp shade 3 of the present invention comprises a shade body 30 and a double-sided adhesive tape 31. The shade body 30 is formed of soft plastics having good light transmission and heat resistance and generally in the shape of a quarter of a sphere. The shade body 30 further has an arcuated surface, or outer surface 301 and a bottom surface 302. The interior of the shade body 30 is hollow and is opened on a plane perpendicular to the bottom surface 302 and formed into an opening 303. The bottom surface 302 of the shade body 30 is further formed into a cylindrical receiving chamber 304, with one end thereof open to the hollow interior of the shade body 30 and is formed into an opening 305, and the other end open to the bottom surface 302.

The cylindrical receiving chamber 304 is provided for receiving the bulb socket 71, which has a cross-section with a diameter slightly smaller than or equal to that of the bulb socket 71. The opening 305 is designed to allow only the bottom end of the bulb 70 but not the bulb 70 and the bulb socket 71 to pass through. While assembling, the bulb socket 71 is first placed in the cylindrical receiving chamber 304, and then the bottom end of the bulb 70 is passed through the opening 305 and screwed into the bulb socket 71. Since the shade body 20 is made of soft plastics, even the diameter of the cross-section of the cylindrical receiving chamber 304 is slightly smaller than that of the bulb socket 71, the bulb socket 71 can be fitted into the cylindrical receiving chamber 304 and secured in the cylindrical receiving chamber 304 by the wall of the receiving chamber. The bulb set 7 is thus installed in the shade body 30.

Next, the shade body 30 comprising the bulb set 7 is secured to the wall 9' by the double-sided adhesive tape 31. The double-sided adhesive tape 31 is generally in the shape of a sheet having an upper surface 310 and a lower surface 311 and further formed into a hole 312. The area of the hole 312 is the same as that of the cross-section of the cylindrical receiving chamber 304. The wall 9' also has an upper surface 90' with a previously drilled hole 91'. The area of the hole 91' is slightly larger than that of the cross-section of the cylindrical receiving chamber 304. At this point, the upper surface 310 of the double-sided adhesive tape 31 is adhered to the bottom surface 302 of the shade body 30, and then the lower surface 311 of the double-sided adhesive tape 31 is adhered to the upper surface 90' of the wall 9'. The soft shelled lamp shade 3 and the bulb set 7 are thus secured to the wall 9'.

Figure 9:
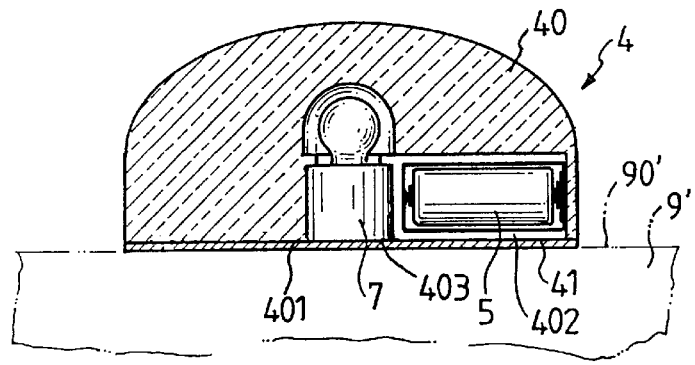
FIG. 9 is a cross-sectional view of a sixth embodiment of a soft shelled lamp shade according to the present invention.

The soft shelled lamp shade in accordance with the present invention can be used not only with an AC power source but also with a DC power source, namely, batteries. FIG. 9 is a cross-sectional view of a sixth embodiment of the soft shelled lamp shade according to the present invention. As shown, the soft shelled lamp shade 4 of the present invention comprises a shade body 40 and a double-sided adhesive tape 41. The shade body 40 is formed of soft plastics having good light transmission and heat resistance, which is generally in the shape of a hemisphere and has a bottom surface 401. A receiving chamber 402 is further formed in the shade body 40 and opened on the bottom surface 401 such that an opening 403 is formed on the bottom surface 401. A bulb set 7 and a bank of batteries 6 can be placed into the receiving chamber 402 through the opening 403.

Next, the shade body 40 comprising the set of bulb set 7 and the bank of batteries 6 is secured to the wall 9' by the double-sided adhesive tape 41. The wall 9' has an upper surface 90'. The double-sided adhesive tape 41 is generally in the shape of a sheet having an upper surface 410 and a lower surface 411. At this point, the upper surface 410 of the double-sided adhesive tape 41 is adhered to the bottom surface 401 of the shade body 40, and then the lower surface 411 of the double-sided adhesive tape 41 is adhered to the upper surface 90' of the wall 9'. The soft shelled lamp shade 4 is thus secured to the wall 9'.

Figure 10:
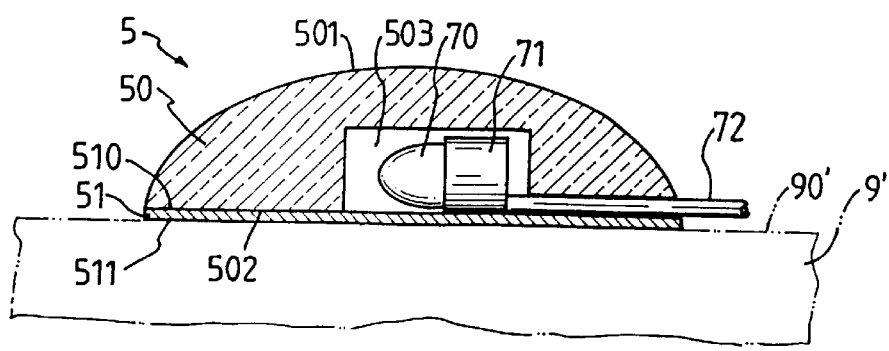
FIG. 10 is a cross-sectional view of a seventh embodiment of a soft shelled lamp shade according to the present invention.

The above described fourth, fifth and sixth embodiments are used primarily for installation under a ceiling on a wall, in a cabinet, etc. If there is no hole previously drilled on the ceiling or the wall for the electric wires, or drilling holes is not desirable, the shade body can be performed on the bottom surface with grooves for receiving the wires. FIG. 10 is a cross-sectional view of a seventh embodiment of the soft shelled lamp shade according to the present invention. As shown, the soft shelled lamp shade 5 of the present invention comprises a shade body 50 and a double-sided adhesive tape 51. The shade body 50 is formed of soft plastics having good light transmission and heat resistance and generally in the shape of a hemisphere. The shade body 50 further has an outer surface 501 and a bottom surface 502. The shade body 50 forms a cylindrical receiving chamber 503 which is open at the bottom surface 502 of the shade body 50 and is formed into an opening 504. In addition, a groove 505 is formed on the bottom surface 502 and passes from the cylindrical receiving chamber 503 to the outer surface 501 of the shade body 50.

The cylindrical receiving chamber 503 is provided for receiving the bulb set 7. While assembling, the bulb 70 is screwed into the bulb socket 71 which includes a wire 72, to form a bulb set 7. The bulb set 7 is then placed in the cylindrical receiving chamber 503. Further, the wire 72 of the bulb set 7 is placed within the groove 505.

In addition to the lamp shades disclosed in the above embodiments, the invention further discloses a lamp shade assembly which includes any one of the above lamp shades and a bulb socket.

Next, the shade body 50 comprising the bulb set 7 is secured to the wall 9' by the double-sided adhesive tape 51. The double-sided adhesive tape 51 is generally in the shape of a sheet having an upper surface 510 and a lower surface 511. At this point, the upper surface 510 of the double-sided adhesive tape 51 is adhered to the bottom surface 502 of the shade body 50, and then the lower surface 511 of the double-sided adhesive tape 51 is adhered to the upper surface 90' of the wall 9'. The soft shelled lamp shade 5 and the bulb set 7 are thus secured to the wall 9'.

Since the shade body is made of soft plastics, it can be precast into the shape of a piece of sculpture in appearance to match with the decoration of a room for enhanced aesthetic effects. Further, although the present invention has been described with respect to the preferred embodiments thereof, various changes and applications can be made by those skilled in the art without departing from the technical concepts of the present invention. The present invention is not limited to the particular details as described in the preferred embodiments. Therefore, it is intended that all such changes of certain features of the preferred embodiments which do not depart from the overall basic functions and the concepts of the present invention should still be considered within the scope defined in the appended claims.

I claim:

1. A soft shelled lamp shade comprising:
   a shade body formed of soft plastics having good light transmission and heat resistance, said shade body having an outer surface and a bottom surface;
   a receiving chamber being formed within said shade body, said receiving chamber being opened at said bottom surface and formed into an opening;
   a hollow cylindrical body having two hollow ends being projected from said bottom surface of said shade body with one of said hollow ends of said cylindrical body connecting with said opening of said receiving chamber; and
   a double-sided adhesive tape being in the shape of a sheet and having an upper and a lower surfaces, said upper surface of said double-sided adhesive tape being at least partially adhered on said bottom surface of said shade body.

2. The soft shelled lamp shade according to claim 1, wherein a recess is formed on said bottom surface around said cylindrical body and said upper surface of said double-sided adhesive tape is at least partially adhered into said recess on said bottom surface of said shade body.

3. The soft shelled lamp shade according to claim 1, wherein said shade body is further formed into two or more ventilation holes passing through said outer surface of said shade body to said receiving chamber.

4. The soft shelled lamp shade according to claim 1, wherein a plurality of pellets are provided within said shade body.

5. The soft shelled lamp shade according to claim 1, wherein said upper surface of said double-sided adhesive tape has patterns.

6. The soft shelled lamp shade according to claim 1, wherein said shade body is formed of two or more layers of soft plastics.

7. The soft shelled lamp shade according to claim 6, wherein at least one of said soft plastic layers is colored.

8. A soft shelled lamp shade comprising:
   a shade body formed of soft plastics having good light transmission and heat resistance, said shade body having a bottom surface, said shade body further formed into a receiving chamber therein, said receiving chamber being opened on said bottom surface and formed into an opening, a bank of batteries being placed in said receiving chamber; and
   a double-sided adhesive tape being in the shape of a sheet and having an upper and a lower surfaces, said upper surface being adhered to said bottom surface of said shade body.

9. A soft shelled lamp shade assembly, comprising:
   a soft shelled lamp shade, including:
      a shade body formed of soft plastics having good light transmission and heat resistance, said shade body having an outer surface and a bottom surface;
      a receiving chamber being formed within said shade body, said receiving chamber being opened at said bottom surface and formed into an opening; and
      a double-sided adhesive tape being in the shape of a sheet and having an upper and a lower surface, said upper surface of said double-sided adhesive tape being at least partially adhered on said bottom surface of said shade body; and
   a bulb socket being received within said receiving chamber of said lamp shade.

10. The soft shelled lamp shade assembly according to claim 9, wherein said receiving chamber is further formed into at least one opening at said outer surface of said shade body.

11. The soft shelled lamp shade assembly according to claim 10, wherein said shade body has a recessed outer surface.

12. The soft shelled lamp shade assembly according to claim 11, further comprising a reflective plate on said recessed face of said shade body.

13. The soft shelled lamp shade assembly according to claim 9, wherein said bottom surface of said shade body is provided with a groove passing from said receiving chamber to said outer surface of said shade body.

14. The soft shelled lamp shade assembly according to claim 9, wherein said shade body further comprises a plurality of pellets having different colors.

* * * * *